US006935260B2

(12) United States Patent
Kromm et al.

(10) Patent No.: US 6,935,260 B2
(45) Date of Patent: Aug. 30, 2005

(54) NOTCHED SEAM DESIGN FOR INTERIOR TRIM UPHOLSTERY PIECES

(75) Inventors: Donald Kromm, Orion Township, MI (US); Dorothy Berz, Macomb, MI (US)

(73) Assignee: Irvin Automotive Products, Inc., Pontiac, MI (US)

(*) Notice: Subject to any disclaimer, the term of this patent is extended or adjusted under 35 U.S.C. 154(b) by 41 days.

(21) Appl. No.: 10/686,259

(22) Filed: Oct. 15, 2003

(65) Prior Publication Data

US 2005/0081771 A1 Apr. 21, 2005

(51) Int. Cl.[7] ................................................ D05B 15/00
(52) U.S. Cl. .............................. 112/475.08; 112/470.27
(58) Field of Search ....................... 112/475.08, 475.06, 112/475.17, 470.27, 122.4, 147, 153, 28, 441; 83/917, 918, 936; 297/218.1, DIG. 1, DIG. 2; 428/102, 192, 904

(56) References Cited

U.S. PATENT DOCUMENTS

| | | | | |
|---|---|---|---|---|
| 3,695,690 A | * | 10/1972 | Carson | 297/218.3 |
| 3,971,112 A | | 7/1976 | Amato et al. | |
| 4,124,937 A | | 11/1978 | Gaughf, Jr. | |
| 4,589,358 A | | 5/1986 | Goldbeck et al. | |
| 4,597,521 A | | 7/1986 | Wilson | |
| 4,930,219 A | | 6/1990 | Nadeau | |
| 5,158,634 A | | 10/1992 | Kasuya | |
| 5,362,535 A | * | 11/1994 | Sasaki et al. | 428/43 |
| 5,501,165 A | | 3/1996 | Nagashima | |
| 5,590,615 A | | 1/1997 | Wong | |
| 5,653,503 A | | 8/1997 | Taggart | |
| 5,687,662 A | * | 11/1997 | Kawasaki | 112/475.08 |
| 6,079,343 A | | 6/2000 | Wong | |
| 6,144,890 A | | 11/2000 | Rothkop | |
| 6,505,570 B1 | * | 1/2003 | Sakamoto et al. | 112/470.27 |
| 6,669,262 B1 | * | 12/2003 | Crotty et al. | 296/97.1 |

* cited by examiner

*Primary Examiner*—Ismael Izaguirre
(74) *Attorney, Agent, or Firm*—Raggio & Dinnin, P.C.

(57) ABSTRACT

A process for joining adjacent edges of vehicle upholstery panels, particularly in applications wherein at least one of the edges is curved. The process includes the step of forming a plurality of U-shaped notches along a curved edge of a first upholstery panel, which are substantially evenly spaced along a portion of the curved length of the upholstery panel edge. At least a portion of an edge of a second upholstery panel is substantial aligned with a portion of the curved edge of the first upholstery panel. The first and second panels are stitched along a stitch line substantially parallel to edges of the first and second panels, wherein the stitch line is offset from aligned edges of the first and second panels by a distance greater than the depth of the notches and wherein successive portions of the edges are brought into alignment as stitching progresses.

20 Claims, 2 Drawing Sheets

NOTCHED SEAM DESIGN FOR INTERIOR TRIM UPHOLSTERY PIECES

TECHNICAL FIELD

The present invention relates generally to processes and designs for connecting pieces of upholstery material, and relates more particularly to a process and design for notching edges of upholstery joined along a seam wherein at least one of the edges is curved.

BACKGROUND OF THE INVENTION

Automotive engineers and designers have long sought to create vehicles having aesthetically pleasing exterior and interior designs. Exterior designs have become increasingly uniform over the years. Hence, the importance of uniqueness and aesthetic appeal in the automotive interior has grown. In particular, attractive upholstered coverings for interior trim, seats, and steering wheels are a hallmark of the modern, high-quality automobile. Moreover, ever-higher customer quality demands continue to raise the bar for commercial acceptability, and aesthetic appeal has become paramount in the sale of higher profit margin vehicles. Accordingly, attention has turned to less traditional elements of interior design. One example of such new focus involves the appearance of seams in upholstered interior components such as seats and headrests.

A problem whose resolution has long confounded designers is wrinkling proximate the seam at which adjacent upholstery panels or sheets are joined. This phenomenon has been shown to be particularly acute where the interface of adjacent upholstery sheets involves a curve, for example the ends of headrests, and various other contoured portions of vehicle seats. Because the otherwise flat material must be stretched, compressed or otherwise strained to form a curved shape, buckling, known in the art as "knuckling" tends to occur around seam regions. Thus, an otherwise smoothly curving outer upholstery surface can exhibit unsightly knuckling adjacent the region where the sheets covering the headrest interface. Addressing this phenomenon has also slowed the manufacturing process, which in turn raises manufacturing cost—a highly undesirable effect. It is preferred to have an upholstery sewing process which is simple to perform and reduces sewing time.

Various methods have been developed to address the "knuckling" problem, however, most have met with only limited success. The present invention is directed at least in part to one or more problems or shortcomings set forth above.

SUMMARY OF THE INVENTION

It is an object of the present invention to provide a means for improving the appearance of upholstered vehicle interior parts by reducing knuckling along upholstery seams.

In accordance with this and other objects, the present invention preferably provides a process for joining adjacent edges of vehicle upholstery panels, wherein at least one of the edges is curved. The process preferably includes the step of forming a plurality of U-shaped notches along a curved edge of a first upholstery panel, preferably substantially evenly spaced along a portion of the curved length of the upholstery panel edge. The process further includes the steps of positioning a second upholstery panel in substantial alignment with the first upholstery panel, and stitching the first and second panels along a stitch line substantially parallel to edges of the first and second panels. The stitch line is offset from aligned edges of the first and second panels by a distance greater than the depth of the notches.

BRIEF DESCRIPTION OF THE DRAWINGS

FIG. 5 illustrates curving and straight upholstery pieces having notches formed along adjoining edges in accordance with the present invention.

DETAILED DESCRIPTION OF PREFERRED EMBODIMENTS

Figure 1:
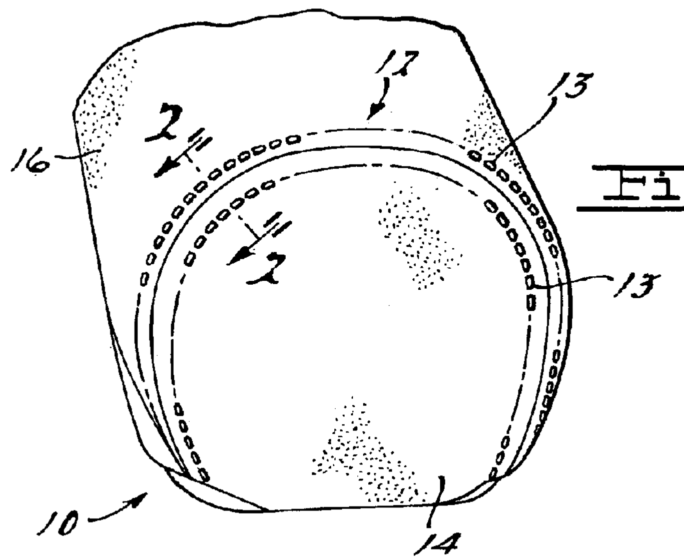
FIG. 1 is an elevational view of a vehicle headrest having a seam according to a preferred embodiment of the present invention.

Referring to FIG. 1, there is shown a partial elevational view of a vehicle headrest 10 having a seam 12 manufactured in accordance with the present invention. Seam 12 is preferably formed at an interface of two panels/sheets of upholstery 14 and 16. The present invention broadly comprises a notching configuration and process for reducing wrinkles or "knuckling" in vehicle upholstery panels. As used herein, "knuckling" refers to disruptions in otherwise smooth or smoothly curving upholstery surfaces. For example, where a straight edge of an upholstery panel is joined to a curved edge, the stretching, compression and/or stress on the material necessary to form the seam has a tendency to create buckles, bumps, ridges or other wrinkle-type features in the material adjacent the seam. The present invention is contemplated for particular use with leather and imitation leather type coverings, however, the disclosed processes and designs are not limited to such an application, and other material types are suitable for application of the present invention. In the FIG. 1 embodiment, sheets 14 and 16 comprise the covering of a substantially cylindrical vehicle headrest, commonly used, for example, as a back seat or third row headrest. The present invention, however, is not limited to vehicle headrests, and may be useful any place in a vehicle where an upholstery sheet having a curved edge is to be joined with an adjacent edge that is either a straight or curved edge.

Figure 2:
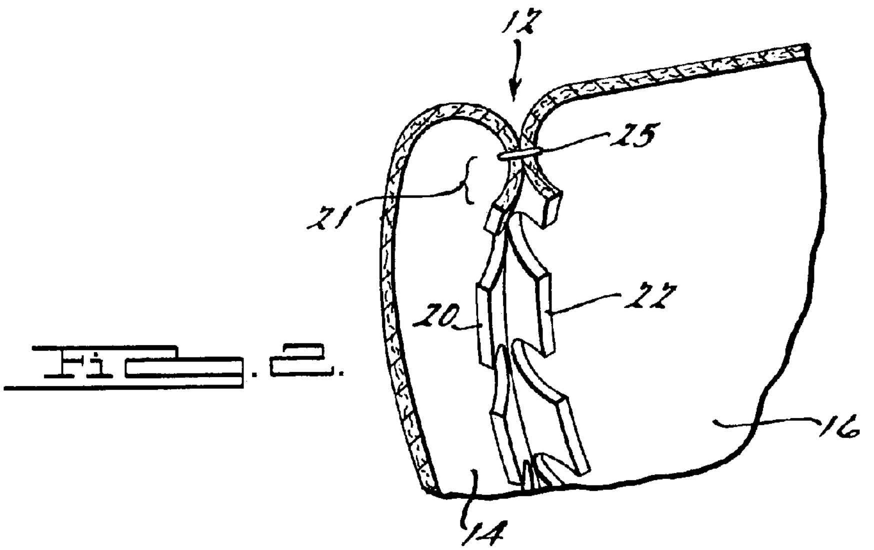
FIG. 2 is a partial sectioned view of the inside of a seam between two pieces of attached upholstery illustrating notches in the material formed in accordance with the present invention.

Seam 12 is involute, wherein the joined edges adjacent the interface of sheets 14 and 16 plunge downwardly or inwardly relative to the exterior upholstery surfaces of the headrest. Referring to FIG. 2, there is shown a view of the two edges 20 and 22 of seam 12. FIG. 2 is thus representative of a view from inside the vehicle headrest 10 of FIG. 1, and illustrates adjacent, joined upholstery sheets 14 and 16 as they would appear after forming an initial join sew 25. In a preferred embodiment, join sew 25 is a stitching line oriented substantially parallel to edges 20 and 22, and extends substantially along a length thereof. Upon stitching join sew 25 a "selvedge" edge portion 21 is defined. The term selvedge refers to the portion(s) of upholstery material that lies "outboard" of the join sew 25, that is, between the join sew 25 and edges 20 and 22. As used herein, the terms "outboard" and "inboard" refer to directions toward and away, respectively, from edges 20 and 22.

During a typical stitching process according to the present invention, after joining sheets 14 and 16 with join sew 25, a variety of subsequent sewing steps are undertaken to complete the construction of the seam and attachment of the sheets 14 and 16. For example, edges 20 and 22 can be maintained substantially flush and parallel and the adjacent sheet edges (the selvedge 21) folded to one side of join sew 25, a style known in the art as a "deck seam." When positioned against either of the main or inboard portions of sheets 14 and 16, a stitching line (not shown in FIG. 2) can be formed through selvedge 21, attaching selvedge 21 to the main portion of the upholstery sheet, which may be either of panel 14 or 16, depending upon which direction selvedge 21 is folded. This deck seam stitching line formed through selvedge 21 subsequent to forming join sew 25 preferably lies inboard of the notches (described below), and is substantially parallel to join sew 25. This deck seam stitching line is primarily decorative, and is visible from the exterior of the upholstered trim member. An exterior view of a deck seam according to the present invention would appear similar to the FIG. 1 illustration, however, only a single decorative seam 13 would be visible.

In an alternative seam configuration, edges 20 and 22 are each folded laterally, but in opposite directions. Thus, the separate portions of panels 14 and 16 that comprise the selvedge 21 and lie outboard of join sew 25 are formed into a "butterfly" seam configuration, as the design is known in the art. Edges 20 and 22 are folded back against the sheets 14 and 16 of which they are parts, respectively. Once positioned against the inboard inner sides of sheets 14 and 16, edges 20 and 22 are sewn to sheets 14 and 16 with a plurality of stitches that are preferably substantially parallel to the edges 20 and 22, preferably penetrating both adjacent layers (selvedge portion and main portion). Such a seam configuration is known in the art as a "French" seam. Typical French seam stitch lines 13 are illustrated on the exterior of headrest 10 in FIG. 1, serving as decorative accents. It should be appreciated that either of the above seam configurations may be formed with the same initial steps of the present invention, described herein. Different vehicle models or versions may make either of the seam constructions desirable. Further, other decorative seam designs might be manufactured according to the present invention. For example, rather than a deck or French seam, the selvedge 21 may remain unattached.

Figure 3:
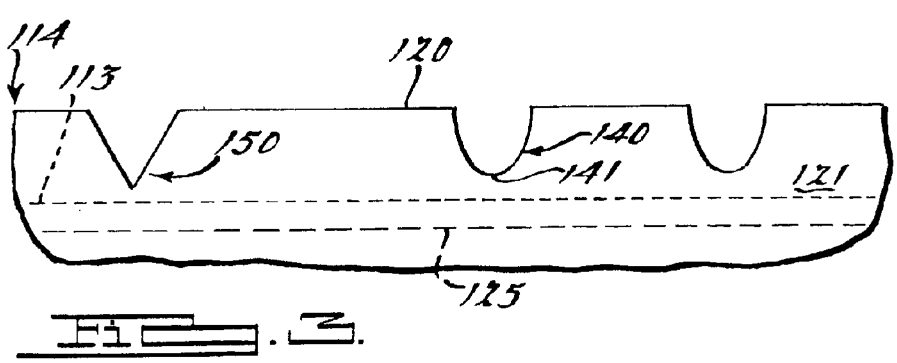
FIG. 3 is a schematic view of an upholstery edge notched in accordance with the present invention.
Figure 3:
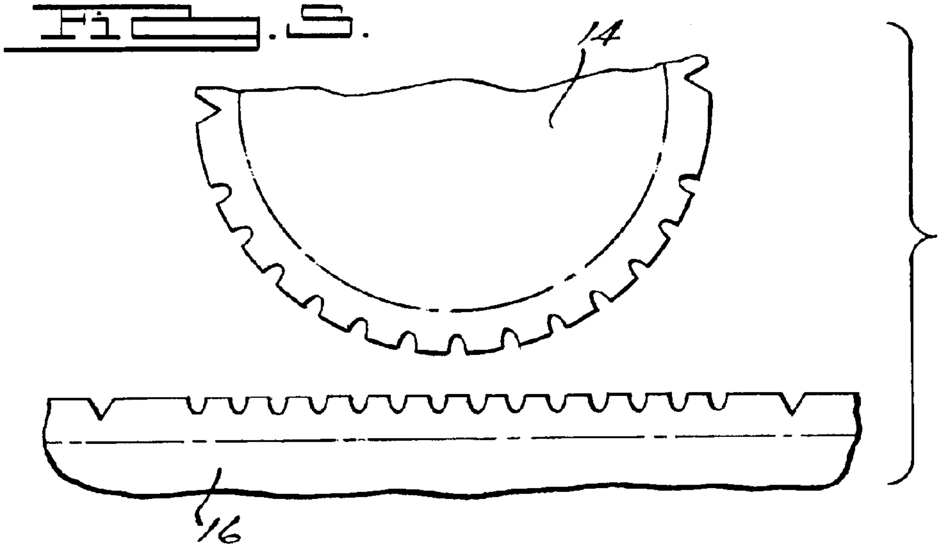

Turning to FIG. 3, there is shown a schematic illustration of a portion of an upholstery sheet 114 having notches formed therein along an exemplary upholstery edge 120. Although in FIG. 3 upholstery sheet 114 is illustrated as having a relatively straight edge, it should be appreciated that the edge may be either straight or curved. It should be appreciated that FIG. 3 is schematic only, and should not be taken to limit the various relative sizes and/or positioning of the features illustrated therein. Moreover, the illustrated configuration is suitable for either of a French or deck seam. The notches preferably comprise a plurality of substantially U-shaped notches 140 and one or more "standard" or V-shaped notches 150. A selvedge portion of upholstery sheet 114 is denoted 121. FIG. 3 also schematically illustrates the relative positions of a join sew 125 and decorative stitching 113. As illustrated, stitching line 113 is preferably positioned inboard and non-overlapping of notches 140 and 150 and outboard of join sew 125. In a preferred embodiment, stitching line 113 is positioned at least 1 mm inboard of the notches. It should be appreciated that the relative spacing of stitching lines 113 and 125 could be varied significantly without departing from the scope of the present invention. For example, join sew 125 might be positioned a greater inboard distance from edge 120, thereby creating a relatively wider region of material outboard of join sew 125 that comprises the selvedge 121. In a preferred embodiment that includes decorative stitching 113, join sew 125 is at least 8 mm inboard of edge 120. In embodiments wherein decorative stitching is not used, join sew 125 may be positioned as little as about 4 mm from edge 120, or as far as about 11 mm.

After forming join sew 125, there is flexibility in the positioning of decorative stitching 113. The distance separating stitching 113 from join sew 125 will depend upon the desired aesthetic appearance of the finished seam. Referring also to FIG. 1, where it is desirable to locate decorative stitching 13, 113 relatively farther away from or closer to a center of seam 12 (shown in FIG. 1 only), stitching 13, 113 may be positioned closer to or farther from notches 140.

In a preferred embodiment, the V-shaped notches 150 serve as a visual marker for indicating to an operator the appropriate position to start or stop a particular sewing process. The distance along upholstery edge 120 separating standard notch 150 from the first U-shaped notch 140 is preferably at least about 18 mm, more preferably from 18 mm to 22 mm, and most preferably 20 mm. In a preferred embodiment, the U-shaped notches 140 are positioned substantially equidistant from one another, for example, about 8 mm to about 12 mm apart, most preferably 10 mm, and preferably have substantially equal width and depth, preferably being about 3 mm wide by about 3 mm deep. The preferred dimensions for the notches of 3 mm by 3 mm have been found to be well suited to commercially available vehicle trim upholstery. Because the distance join sew 125 lies inboard of edge 120 ranges from about 4 to about 11 mm, in a seam constructed according to a preferred embodiment of the present invention, notches 140 preferably extend in an inboard direction a distance ranging between about $3/11$ the total width of selvedge 121 and about $3/4$ the total width of selvedge 121. The notches 140 are preferably formed such that they extend inwardly from the edge 120 of the upholstery sheet a distance such that an apex 141 of the notch 140 is not overlaid by the decorative stitching line 113 that attaches the selvedge 121 to the main (inboard) portion of the upholstery sheets 14 and/or 16.

By forming notches 140 in the preferred U-shape, an optimum amount of material is removed from selvedge 121 as compared to standard notches. Moreover, it has been found that the "point" of standard V-shaped notches can be responsible for creating a buckle or knuckle in the upholstery material. It should be appreciated that while a U-shape substantially as shown in FIG. 3 is preferred, the degree of curvature of the U-shape could be varied without departing from the scope of the present invention, so long as the apex 141 is substantially arcuate. For example, a notch having a more or less sharply pointed apex 141 could be utilized without departing from the scope of the present invention. Similarly, the curvature of the notches could be varied such that the notch is substantially semi-circular. The removal of material volume by forming notches proximate the edges of the sheets allows the normally flat sheet of material to expand or contract when deformed into a curving outer surface, rather than buckling out of the intended orientation of the sheet. This result has been found to be superior over results achieved with standard notches. Stated another way, the notches remove upholstery, creating otherwise unavailable space for the remaining upholstery material to deform, while leaving sufficient overlapping material to anchor the seam.

The exemplary headrest in FIG. 1 comprises a substantially flat sheet 16 rolled into a cylindrical shape. The cylinder defined by sheet 16 is joined at an end to the substantially flat, circular sheet 14. Exemplary upholstery sheets are illustrated in FIG. 5. Because the seam 12 along which the respective sheets are joined is preferably involute, the joined edges of material curve inwardly relative to the main exterior portions of the material. In other words, the material edges (the selvedge 21) curve in a direction away from the surface of the material that is ultimately intended as the exterior of the upholstered interior trim member. This relationship is illustrated in FIGS. 1 and 2, wherein the selvedge 21 is located on the inside of the upholstery covering. Because cylindrical sheet 16 is rolled such that it is at least partially cylindrical, each edge or end of rolled sheet 16 substantially defines at least a portion of a circle. The inward fold or curve of this sheet edge or end of sheet 16 necessary to form seam 12 in attaching with sheet 14 would tend to cause buckling/knuckling proximate the seam in an un-notched design. It has been found that the knuckling disruptions in the otherwise smoothly curving surfaces can manifest as wrinkles proximate seam 12, as well as disruptions in the otherwise arcuate line defined by seam 12 as it traverses the end of the headrest. Stated another way, traditional seam designs are known to knuckle the upholstery sheets, i.e. by wrinkling them, and are also known to disrupt a seam that would otherwise define a smoothly arcuate line. Because the two sheets are securely sewn together, knuckling of one sheet can reduce the aesthetic quality of the other sheet by inducing further knuckling therein. By including notches having the disclosed configuration, the knuckling proximate both sides of seam 12 can be reduced or eliminated. Similar principles govern the notching of the adjoining sheet 14, and its folding and joining with sheet 16.

Figure 4:
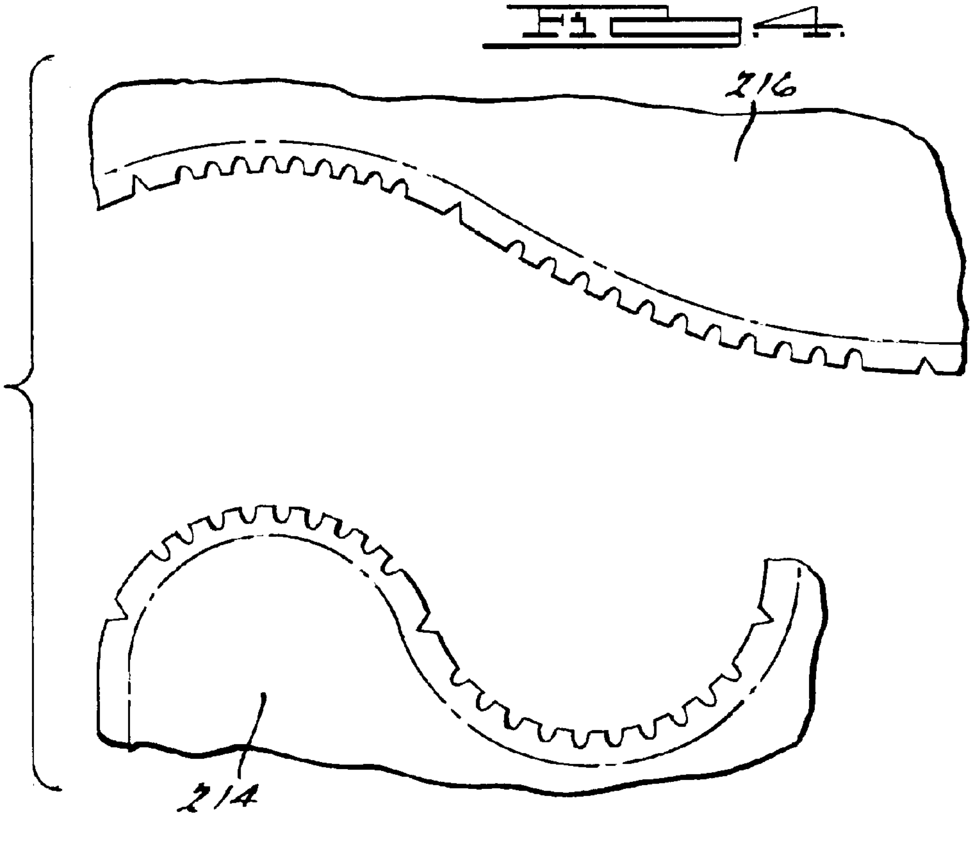
FIG. 4 illustrates adjacent curving upholstery pieces having notches formed along adjoining edges in accordance with the present invention.

FIG. 4 illustrates an alternative embodiment wherein both sheets 214 and 216 to be joined are curved. It should be appreciated that in all the disclosed embodiments, either one or both of the upholstery sheets to be joined may be notched according to the present invention. In an embodiment wherein a curved edge is joined to a straight edge (as in FIG. 1), it is generally preferred to place the notches along the curved edge, with notches on the straight edge not always being necessary. In embodiments wherein both edges to be joined are curved, both sheets of upholstery are preferably notched. Varying shape or specifications of the end upholstered product, however, may call for more or less notching on either or both of the upholstery sheets.

In a related aspect, the present invention comprises a process for manufacturing a vehicle trim member. The process typically begins by notching the upholstery pieces according to the foregoing specifications, preferably forming notches along at least the curved surface to be joined, or where both surfaces are curved, preferably forming the notches substantially opposite one another on both surfaces to be joined. As described herein, the dimensions, shape, and number of the notches will vary depending on such factors as the degree of curvature, desired dimensions of the selvedge, material thickness, etc. Flexible, substantially planar upholstery sheets such as leather or vinyl are preferably used. Where both sheets are notched, the sheets are preferably aligned such that the notches are substantially opposite to notches on the adjoining sheet. The respective edges are then joined with a join sew through both sheets, preferably positioned a distance from the edge such that the join sew stitching does not overlap the notches. Because it may be difficult to align a curved edge with a straight edge for placing the join sew, the edges may be gradually moved into the appropriate position as stitching progresses. Once a portion or all of the join sew stitches have been formed along the edges to be joined, the selvedge portions that are outboard of the join sew may be folded to one side and sewn as a unit (deck seam), or butterflied and sewn separately (French seam). Other types of seams might also be used without departing from the scope of the present invention. Finally, the attached cover pieces are placed over the cushion or backing of the trim member, and the item is inspected and made ready for installation in a vehicle. Alternatives to the disclosed process are possible. For example, rather than preparing the cover sheets ahead of time as disclosed, the sheets might be stitched while wholly or partially attached to the cushion or trim member backing. Further, rather than bringing the edges into alignment as stitching progresses, the sheets can be oriented prior to joining them together (for example with clips or by positioning over a die).

The present description is for illustrative purposes only, and should not be taken to limit the scope of the present invention in any fashion. Those skilled in the art will appreciate that various modifications might be made to the embodiments disclosed herein without departing from the scope and spirit of the present invention. Other aspects, features and advantages will be apparent upon an examination of the attached drawing figures and appended claims.

What is claimed is:

1. A process for joining adjacent edges of upholstery panels for vehicle interior trim, wherein at least one of the edges is curved, the process comprising the steps of:

forming a plurality of U-shaped notches along an edge of a first upholstery panel, wherein the edge is a first edge;

positioning an edge of a second upholstery panel in substantial alignment with the first edge, wherein the edge is a second edge;

attaching the first and second panels with a join sew oriented substantially parallel to the first and second edges, wherein the join sew is offset from the first and second edges by a distance greater than a depth of the notches;

stitching portions of the first and second panels outboard of the join sew to either the first or second panel along a stitch line positioned outboard of the join sew and inboard of the notches.

2. The process of claim 1 wherein the U-shaped notches have a depth in the range of about 3/11 to about 3/4 of a width of the portions of the first and second panels outboard of the join sew.

3. The process of claim 2 wherein the U-shaped notches are about 3 mm in width and about 3 mm in depth.

4. The process of claim 1 further comprising the step of forming a plurality of U-shaped notches along the second edge.

5. The process of claim 4 wherein the step of positioning the second edge in alignment with the first edge comprises substantially aligning the notches on the respective upholstery panels.

6. A vehicle trim member manufactured according to the process of claim 1.

7. A process for joining adjacent edges of upholstery panels for vehicle interior trim, wherein at least one of the edges is curved, the process comprising the steps of:

forming a plurality of U-shaped notches along an edge of a first upholstery panel, wherein the edge is a first edge;

positioning an edge of a second upholstery panel in substantial alignment with the first edge, wherein the edge is a second edge;

attaching the first and second panels with a join sew oriented substantially parallel to the first and second edges, wherein the join sew is offset from the first and second edges by a distance greater than a depth of the notches;

folding portions of the first and second panels outboard of the join sew in opposite directions, and against inboard portions of the panels;

stitching the folded outboard portions to the inboard portions of the respective upholstery panels along stitching lines located outboard of the join sew, and positioned inboard of the edges a distance greater than a depth of the notches.

8. The process of claim 7 wherein the U-shaped notches have a depth in the range of about 3/11 to about 3/4 of a width of the portions of the first and second panels outboard of the join sew.

9. The process of claim 8 wherein the U-shaped notches are about 3 mm in width and about 3 mm in depth.

10. The process of claim 7 further comprising the step of forming a plurality of U-shaped notches along the second edge.

11. The process of claim 10 wherein the step of positioning the second edge in alignment with the first edge comprises substantially aligning the notches on the respective upholstery panels.

12. A vehicle trim member manufactured according to the process of claim 7.

13. An upholstered vehicle trim member comprising:

a cushion;

a first upholstery panel overlaying said cushion and having at least one curved edge, wherein the first upholstery panel defines a set of substantially evenly spaced U-shaped notches along the curved edge;

a second upholstery panel overlaying said cushion and having a second edge;

said first and second upholstery panels being attached along a join sew oriented substantially parallel to the first and second edges, and positioned inboard of said edges a distance greater than a depth of the notches;

a stitching line attaching portions of said first and second panels outboard of the join sew to said first or said second panel inboard of the join sew.

14. The upholstered vehicle trim member of claim 13 wherein said set of substantially evenly spaced U-shaped notches are positioned about 8 mm to about 12 mm apart.

15. The upholstered vehicle trim member of claim 13 wherein the upholstery panels are formed from animal leather.

16. A process for manufacturing an upholstered vehicle trim member wherein two upholstery panels are joined along adjacent edges, and wherein at least one of the adjacent edges is a curved edge, the process comprising the steps of:

positioning an edge of a first upholstery panel defining a plurality of U-shaped notches in alignment with an edge of a second upholstery panel;

attaching the first and second panels proximate the first and second edges with a join sew positioned inboard of the U-shaped notches and oriented substantially parallel to the edges;

attaching portions of the first and second panels outboard of the join sew to either of the first and second upholstery panels with stitches positioned outboard of the join sew and inboard from the edges a distance greater than a depth of the notches;

positioning the attached first and second panels around a trim member backing.

17. An upholstered vehicle trim member manufactured by the process of claim 16.

18. An upholstery covering for a piece of vehicle trim having reduced material volume along an interface of joined upholstery panels comprising:

a first upholstery sheet defining a set of U-shaped notches substantially evenly spaced along a curved edge;

a second upholstery sheet stitched to the first sheet and having an edge substantially aligned with the curved edge, wherein the second sheet is stitched to the first sheet along a join sew positioned inboard of the edges of the upholstery sheets a distance that is up to about four times a depth of the notches;

wherein the U-shaped notches reduce upholstery material volume along the edge of the first sheet, thereby imparting a curved surface contour at an interface of the first and second upholstery sheets that is substantially free from wrinkling.

19. The upholstery covering of claim 18 wherein portions of the first and second sheets outboard of the join sew are folded in opposite directions, and stitched to portions of the first and second sheets inboard of the join sew, respectively.

20. The upholstery covering of claim 18 wherein portions of the first and second sheets outboard of the join sew are folded and stitched to the first or the second sheet.

* * * * *